G. W. & L. DEMOND.
Chimney-Tops and Ventilators.
No. 209,552.  Patented Nov. 5, 1878.
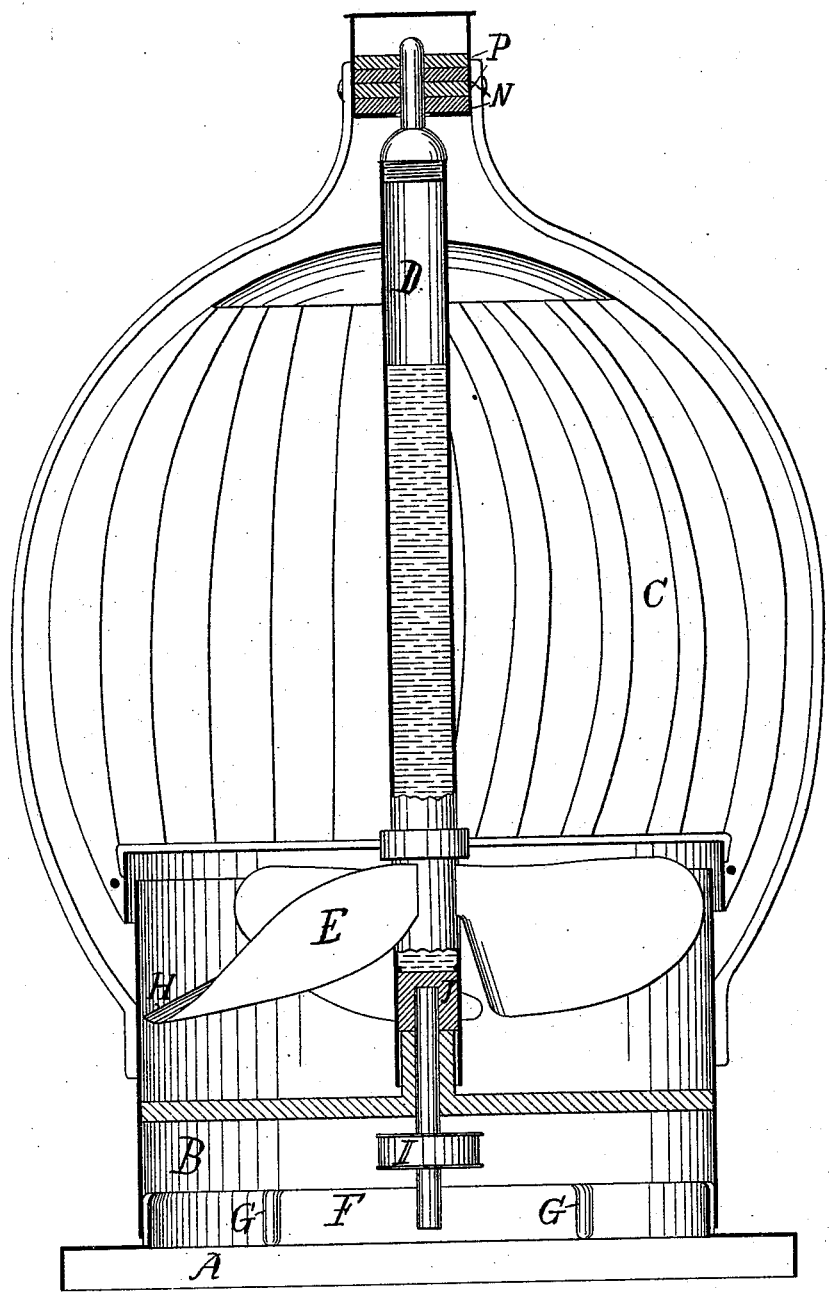
Witnesses:
A. Hurd
R. Chandler
Inventors:
George W. Demond
Louis Demond
Per G. Stackpole, atty

UNITED STATES PATENT OFFICE.

GEORGE W. DEMOND AND LOUIS DEMOND, OF BROOKLYN, NEW YORK.

IMPROVEMENT IN CHIMNEY-TOPS AND VENTILATORS.

Specification forming part of Letters Patent No. 209,552, dated November 5, 1878; application filed August 30, 1878.

*To all whom it may concern:*

Be it known that we, GEORGE W. DEMOND and LOUIS DEMOND, both of the city of Brooklyn, in Kings county, and State of New York, have invented certain new and useful Improvements in Chimney-Tops and Ventilators for Buildings, which improvements are fully set forth in the following specification and accompanying drawing, in which—

Figure 1 is a vertical section of our improved chimney-top and ventilator.

A is the base. B is the body or cylinder. C is the winged top. D is the shaft. E is the suction-screw attached to the shaft.

The base A has an upward projection, F. The top of this projection is curved inwardly, and channels G are made down its side. The body or cylinder B shuts over the projection F, and rests on the base A.

The suction-screw E has one or more wings. These wings are curved upward at their edges to form gutters H, to catch any water that may find its way through the winged top C and conduct it off against the inner walls of the body or cylinder B. The water thus conducted to the walls of the cylinder runs down and is caught by the inwardly-turned top of the projection F, and turned to the outside and runs off through the channels G to the outside of the base and building.

The shaft D is made of tubing, the lower end of which is plugged with lignum-vitæ or other suitably hard and absorbent material to form the socket-bearing. The shaft is then filled with oil and hermetically sealed at its top. Sufficient oil will be absorbed by the plug in the socket-bearing to make it self-lubricating.

The upper end of the shaft D is made self-lubricating by forming the socket of alternate layers of graphite N and washers.

The washers P are made of any suitable material, and are for the purpose of holding the graphite in place.

When we wish to apply power we extend the shaft downward and attach a pulley, I, as shown, to which steam or other power may be applied by means of a belt.

Our invention consists of the hollow shaft D, filled with oil and plugged at the bottom with lignum-vitæ or other suitable material and hermetically sealed at its top; also, the socket at the top, formed of alternate layers of graphite and washers to hold it in place, the suction-screw E having curved edges as gutters for conducting off the water, and the inwardly-turned top of the upward projection F on the base A, and gutters or channels G for conducting the water to the outside of the building; also, the combination of the extended shaft and pulley I with the suction-screw E and winged top C, so that steam or other power may be applied.

The object of our invention is to make the bearings of the shaft in a revolving chimney-top or ventilator self-lubricating; also, to so construct the parts that no water can run down inside the chimney or building, and to provide the means for applying steam or other power.

Having thus described our invention, what we claim as new, and desire to secure by Letters Patent, is—

1. A chimney-top or ventilator the shaft of which is made of tubing having a plug of lignum-vitæ or other suitably hard and porous material beyond the lower end of the walls of the tube to form a socket and bearing, substantially as and for the purpose set forth.

2. A chimney-top or ventilator having the shaft D, made of tubing and filled with oil, and resting upon a plug driven into its lower end, and upon which it revolves, substantially as and for the purpose set forth.

3. The combination of the tubular shaft D, revolving in a vertical position upon a plug of porous material, which is driven into its lower end, with the suction-screw E and winged top C, all constructed, arranged, and operating substantially as set forth.

4. The suction-screw E, having the edges of its wings curved upward, forming a gutter, and the upward projection of the base F, having its top curved inward, and channels G on its outside, the suction-screw E inclosed within the cylinder or body of the machine, substantially as and for the purpose set forth.

5. The socket for the top of the shaft formed of alternate layers of graphite and washers to hold it in place, substantially as and for the purpose set forth.

6. The combination of the suction-screw E and winged top C with the extension-shaft and pulley I, for attaching power, substantially as and for the purpose set forth.

GEORGE W. DEMOND.
LOUIS DEMOND.

Witnesses:
A. HURD,
R. CHANDLER.